(12) United States Patent
Kim et al.

(10) Patent No.: US 8,305,532 B2
(45) Date of Patent: Nov. 6, 2012

(54) LIQUID CRYSTAL DISPLAY HAVING WIDE VIEWING ANGLE

(75) Inventors: Kyeong-Hyeon Kim, Kyungki-do (KR); Kye-Hun Lee, Kyungki-do (KR); Seung-Beom Park, Kyungki-do (KR); Jang-Kun Song, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 48 days.

(21) Appl. No.: 11/837,665

(22) Filed: Aug. 13, 2007

(65) Prior Publication Data

US 2007/0285605 A1 Dec. 13, 2007

Related U.S. Application Data

(60) Continuation of application No. 10/404,443, filed on Apr. 2, 2003, now abandoned, which is a division of application No. 09/315,105, filed on May 20, 1999, now Pat. No. 6,567,144.

(30) Foreign Application Priority Data

May 20, 1998 (KR) .................................. 98-018164

(51) Int. Cl.
*G02F 1/1337* (2006.01)
(52) U.S. Cl. ........................................ 349/129; 349/130
(58) Field of Classification Search .................. 349/129, 349/130, 145, 146, 122, 139, 141, 143, 38, 349/39, 113, 114, 144
See application file for complete search history.

(56) References Cited

U.S. PATENT DOCUMENTS

| | | | | |
|---|---|---|---|---|
| 5,535,028 A * | 7/1996 | Bae et al. | | 349/145 |
| 5,739,880 A * | 4/1998 | Suzuki et al. | | 349/110 |
| 5,745,207 A * | 4/1998 | Asada et al. | | 349/141 |
| 5,808,717 A * | 9/1998 | Van Aerle | | 349/129 |
| 5,838,405 A * | 11/1998 | Izumi et al. | | 349/73 |
| 5,852,482 A * | 12/1998 | Kim | | 349/46 |
| 5,872,611 A * | 2/1999 | Hirata et al. | | 349/147 |
| 5,897,182 A * | 4/1999 | Miyawaki | | 349/43 |
| 6,061,106 A * | 5/2000 | Ahn et al. | | 349/83 |
| 6,710,837 B1 * | 3/2004 | Song et al. | | 349/143 |
| 6,724,452 B1 * | 4/2004 | Takeda et al. | | 349/139 |

FOREIGN PATENT DOCUMENTS

JP 62-210423 9/1987

(Continued)

*Primary Examiner* — Richard Kim
*Assistant Examiner* — David Chung
(74) *Attorney, Agent, or Firm* — F. Chau & Associates, LLC

(57) ABSTRACT

Saw-shaped protrusions, which are parallel to each other, are formed on the common electrode and the pixel electrode in two substrates. Protrusions in two substrates are arranged alternately and the bent portions of the saw-shaped protrusions are placed on the line transverse passing through the center of a pixel. Branches extend from the convex point of one saw-shaped protrusion toward the apex to the other saw-shaped protrusion, and another branch extend from the point where the protrusion meets the boundary of the pixel electrode toward the point where the boundary of the pixel electrode and the saw-shaped protrusion make an acute angle. A liquid crystal layer between two electrodes are divided to four regions where the directors of the liquid crystal layer have different angles when a voltage is applied to the electrodes, and then, wide viewing angle is obtained. In most regions, protrusions are formed straight and the protrusions have only obtuse angles at the bent points. Therefore, fast response time is shortened, disclination is removed and luminance increases.

6 Claims, 18 Drawing Sheets

FOREIGN PATENT DOCUMENTS

| | | |
|---|---|---|
| JP | 06-043461 | 2/1994 |
| JP | 07-311383 | 11/1995 |
| JP | 11-109358 | 4/1999 |
| JP | 11-242225 | 9/1999 |

* cited by examiner

LIQUID CRYSTAL DISPLAY HAVING WIDE VIEWING ANGLE

CROSS REFERENCE TO RELATED APPLICATIONS

This application is a continuation of U.S. patent application Ser. No. 10/404,443, filed Apr. 2, 2003 now abandoned, which is a divisional of U.S. patent application Ser. No. 09/315,105, filed May 20, 1999, now U.S. Pat. No. 6,567,144 which claims priority to Korean Application 1998-18164, filed May 20, 1998, the disclosures of which are incorporated by reference herein in their entireties.

BACKGROUND OF THE INVENTION (a) Field of the Invention

The present invention relates to a liquid crystal display having wide viewing angle.

(b) Description of the Related Art

A liquid crystal display (LCD) includes two substrates and a liquid crystal layer interposed therebetween. The transmittance of the incident light is controlled by the strength of the electric field applied to the liquid crystal layer.

A vertically aligned twisted nematic (VATN) liquid crystal display has a couple of transparent substrates which have transparent electrodes respectively on their inner surfaces, a liquid crystal layer between two substrates and a couple of polarizers which are attached to the outer surfaces of the substrates respectively. In off state of the LCD, i.e., in the state that the electric field is not applied to the electrodes, the long axes of the liquid crystal molecules are perpendicular to the substrates. On the other hand, in on state of the LCD, i.e., in the state that the sufficient electric field is applied to the electrodes, the long axes of the liquid crystal molecules are parallel to the substrates and twisted spirally with a constant pitch from the inner surface of one substrate to that of the other substrate, and thus the orientation of the long axes of the liquid crystal molecules vary continuously.

The VATN LCD operating in normally black mode may have an off state which is sufficiently dark because the liquid crystal molecules are aligned perpendicular to the substrates in the off state. Therefore, the contrast ratio is relatively high compared with the conventional TN LCD. However, the viewing angle of the VATN LCD may not be so wide due to the difference between retardation values in various viewing directions.

SUMMARY OF THE INVENTION

It is therefore an object of the present invention to widen the viewing angle of an LCD.

These and other objects, features and advantages are provided, according to the present invention, by a liquid crystal display having protrusion patterns on transparent electrodes for forming multi-domains.

A liquid crystal display, according to the present invention, comprises a first substrate including a common electrode and a first protrusions formed on the common electrode and a second substrate opposite the first substrate, the second substrate including a pixel electrode located at a position corresponding to the common electrode and a second protrusion formed on the pixel electrode, wherein the first and the second protrusions are arranged alternately and a distance between end portions of the first and the second protrusions is less than a distance between remaining portions of the first and the second protrusions. The width of the first and the second protrusions may be in the range of 3-20 μm, and the height of the first and the second protrusions may be in the range of 0.3-3.0 μm.

A liquid crystal layer having negative dielectric anisotropy may be interposed between the substrates, and alignment layers may be formed on inner surfaces of the substrates respectively.

A pair of polarizers may be attached to outer surfaces of the substrates, and the polarizing directions of the polarizers are preferably perpendicular to each other.

Compensation films may be attached between one of the substrates and one of the polarizers attached thereto, and a biaxial or a combination of an a-plate and a c-plate compensation films may be used. The slow axis of the biaxial or the a-plate compensation film is preferably parallel or perpendicular to the polarizing directions of the polarizers.

The second protrusion may have a saw shape and the first protrusion may include a first portion having a saw shape parallel to the second protrusion and a second portion formed at a position corresponding to the boundary of the pixel electrode where an angle between the second protrusion and the boundary of the pixel electrode is an acute angle. A third protrusion extending from the convex point of the first saw shape portion to the second protrusion may be formed on the common electrode, and a fourth protrusion extending from the convex point of the second saw shape protrusion to the first protrusion may be formed on the pixel electrode. The first portion of the first protrusion and the second protrusion may be bent once in a unit pixel region.

The first protrusion may form a substantially tetragonal ring, and the second protrusion may be formed at a position corresponding to the center of the tetragonal ring. The first protrusion preferably forms a substantially regular tetragonal ring, and the first protrusion may be broken at midpoint of each side of the tetragon. The second protrusion may have a cross shape. The number of the first and the second protrusions may be equal to or more than one. The polarizing directions of the first and the second polarizers are parallel to transverse and longitudinal directions of the first protrusion respectively.

Protrusion ratio and luminance increases if a portion of the first protrusion is formed outside of a portion corresponding to the pixel electrode.

When the first and the second substrates are viewed from the top, a region defined by the first and the second protrusions preferably forms a substantially closed polygon, and angle made by the protrusion on one substrate is preferably an obtuse angle. In addition, a long diagonal in a region defined by the first and the second protrusions is a diagonal substantially perpendicular to the liquid crytal director in the regions while a voltage is applied to the pixel electrode and the common electrode and when the first and the second substrates are viewed from the top.

A saw shape protrusion may be formed on a pixel electrode and a gate wiring in the thin film transistor (TFT) substrate may overlaps the protrusion. In the color filter substrate, a saw shape protrusion formed on the common electrode and a black matrix overlapping the protrusion may be formed.

The black matrix may include a portion put across the bent points of the first and the second saw shape protrusion and a triangular portion covering a portion that the first and the second protrusions meet a boundary of the pixel electrode.

The black matrix may include another portion overlapping the first protrusion instead that the gate wiring overlaps the first protrusion.

On the other hand, a first and a second saw shape protrusions parallel and alternate to each other are formed on the common electrode and the pixel electrode respectively, and the pixel electrode may have a saw shape which is convex between points where the first and the second protrusions meet the pixel electrode. The angle between the first protrusion and a boundary of the pixel electrode near the saw shape convex portion is preferably equal to or more than 90°.

The pixel electrode may have a saw shape surrounding the first and the second protrusions.

By forming protrusions on the transparent electrodes in above-described way, a liquid crystal layer between two electrodes are divided to four regions that the directors of the liquid crystal layer have different angles when a voltage is applied to the electrodes, thereby viewing angle is widen and disclination is removed.

DETAILED DESCRIPTION OF THE PREFERRED EMBODIMENTS

Figure 1A:
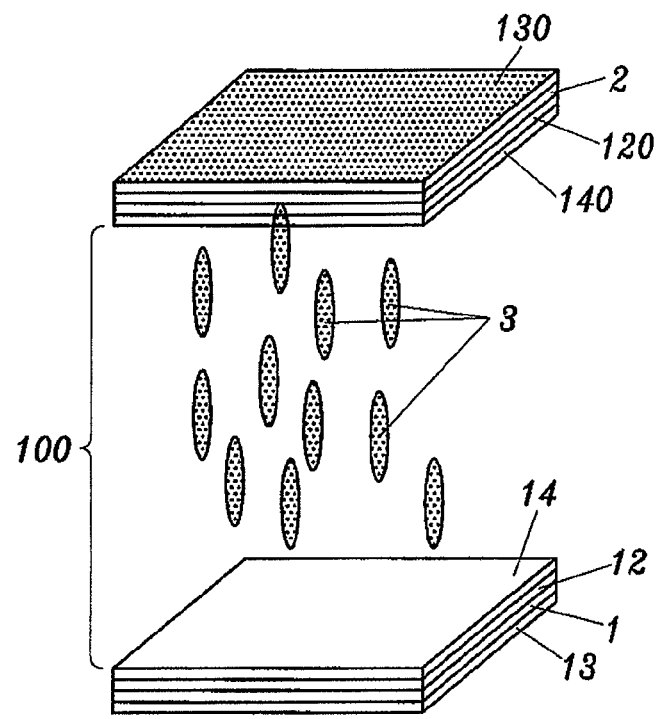
FIGS. 1A and 1B are schematic diagrams of the alignment of liquid crystal molecules of a VATN LCD respectively in black state and white state according to an embodiment of the present invention.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 1B:
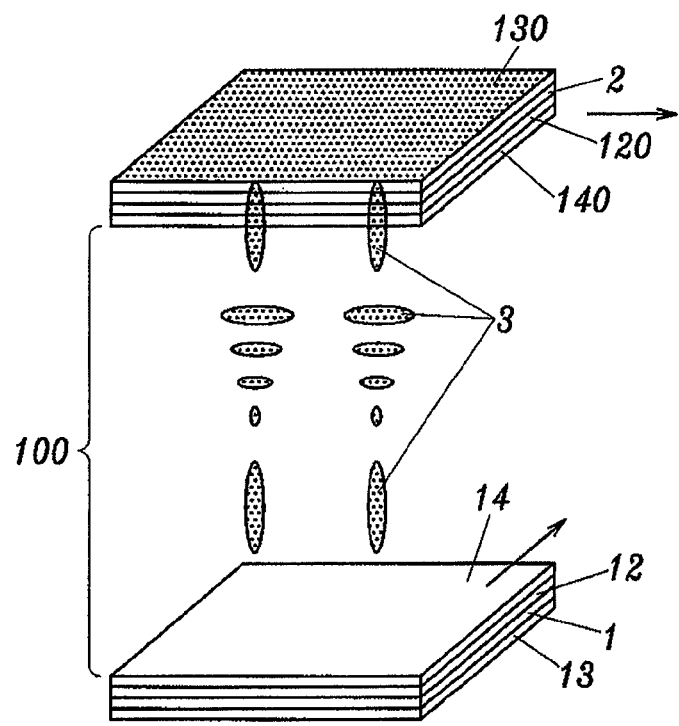

FIGS. 1A and 1B are schematic diagrams of the alignment of liquid crystal molecules of a VATN LCD respectively in black state and white state according to an embodiment of the present invention.

As shown in FIGS. 1A and 1B, two glass or quartz substrates 1 and 2 are spaced apart from each other. On the inner surfaces of the substrates 1 and 2, transparent electrodes 12 and 120 made of a transparent conductive material such as ITO (indium tin oxide) or the like are formed respectively, and alignment layers 14 and 140 are formed thereon respectively. Between the substrates 1 and 2, a liquid crystal layer 100 including a chiral nematic liquid crystal having negative dielectric anisotropy is disposed. On the outer surfaces of the substrates 1 and 2, polarizers 13 and 130 are attached. The polarizers 13 and 130 polarize the incident ray on the liquid crystal layer 100 and the rays out of the liquid crystal layer 100 respectively. The polarizing directions of the polarizers 13 and 130 are perpendicular to each other. The alignment layers 14 and 140 may be rubbed or not.

FIG. 1A shows the off state that the electric field is not applied, where the long molecular axes of the liquid crystal molecules 3 in the liquid crystal layer 100 are aligned perpendicular to the surface of the substrates 1 and 2 by the aligning force of the alignment layers 14 and 140.

The polarized light by the polarizer 13 attached to the lower substrate 1 passes through the liquid crystal layer 100 without changing its polarization.

Then, the light is blocked by the analyzer 130 attached to the upper substrate 2 to make a black state.

FIG. 1B shows the on state that the sufficient electric field is applied to the liquid crystal layer 100 by the electrode 4 and 5, where the liquid crystal molecules 3 in the liquid crystal layer 100 are twisted spirally by 90° from the lower substrate 1 to the upper substrate 2, and the director of the liquid crystal layer 100 varies continuously. However, near the inner surfaces of two substrates 1 and 2, the aligning force of the alignment layers 14 and 140 is larger than the force due to the applied electric field, and the liquid crystal molecules stay vertically aligned.

The polarized light by the polarizer 13 passes through the liquid crystal layer 100 and its polarization is rotated by 90° according to the variation of the director of the liquid crystal layer 100. Therefore, the light passes through the analyzer 130 to make a white state.

Figure 2:
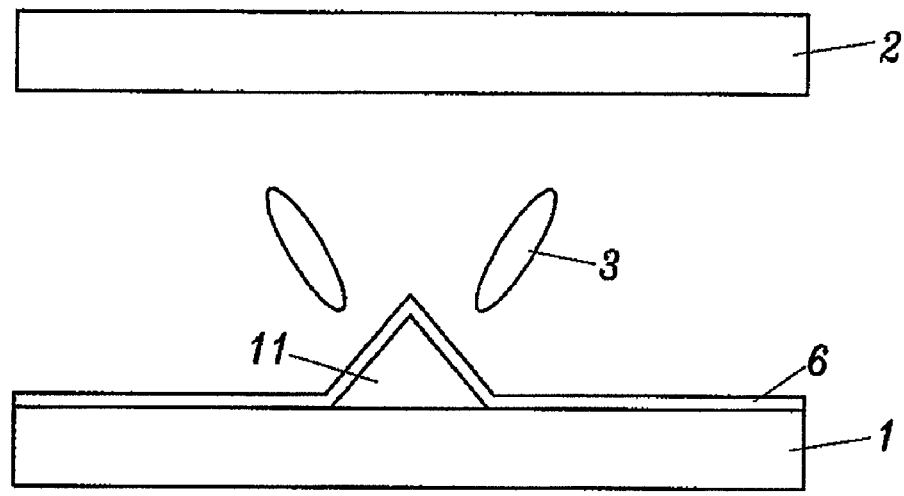
FIG. 2 shows the structure of the protrusion and the alignment of the liquid crystal molecules of a VATN LCD according to an embodiment of the present invention.

FIG.2 shows the structure of the protrusion and the alignment of the liquid crystal molecules of a VATN LCD according to an embodiment of the present invention.

As shown in FIG. 2, a protrusion 11 is formed on a lower substrate 1, and a homeotropic alignment film 6 is formed thereon. Because the long axes of the liquid crystal molecules tend to be perpendicular to the surface due to the aligning force of the alignment film 6, in absence of electric field, the directions of the long axes of the liquid crystal molecules 3 near the protrusion 11 are tilted to the direction perpendicular to the surface of the protrusion 11.

If the sufficient electric field is applied to the crystal layer, the long axes of the liquid crystal molecules 3 tend to be perpendicular to the field direction since the liquid crystal layer has negative dielectric anisotropy. Then, the liquid crystal molecules 3 are tilted and twisted to parallel to the substrates 1 and 2. Because the liquid crystal molecules 3 are tilted to the opposite directions in the initial state, the liquid crystal molecules 3 lie along the initially tilted direction, then, the lying directions of the liquid crystal molecules are opposite with respect to the central surface of the protrusion 11.

Therefore, two regions having different tilt directions are formed thereby widening the viewing angle.

If a protrusion 11 is formed on the substrate 1 and 2 as shown in FIG. 2, it is easy to obtain a multi-domain LCD by a simple process than another process such as rubbing. In addition, the relatively small regions having different arrangements of the liquid crystal molecules can be generated, and the regions can have various forms.

On the other hand, characteristics such as luminance, response time and afterimages, etc., of LCD panels depend considerably on the alignment of liquid crystal molecules. Therefore, the shape of the protrusion pattern is important.

The protrusion pattern for a multi-domain LCD preferably satisfies the conditions that will now be described.

First, it is preferable that the number of the domains which have different average axial directions, especially in a pixel, is at least two, and more preferably the number is four. Here, the average axial direction in a domain means the average direction of the long axes of the liquid crystal molecules in the domain.

Second, it is preferable that the protrusions on the upper and the lower substrates form substantially closed areas and thus substantially closed domains, when viewed from the top. It is because that the texture where the arrangement of the liquid crystal molecules is disordered is generated near the ends of the protrusions, and thus the ends of the protrusions are preferably closely located. Furthermore, the protrusion patterns forming a domain has preferably a rectangular shape.

Third, the average axial direction of each domain, when viewed from the top, preferably makes 45°±10°, more preferably 45° with the polarizing directions of the polarizers especially when using crossed polarizers. This is because high luminance is obtained. In addition, it is preferable that the average axial directions of the adjacent domains are perpendicular to each other. Furthermore, the width of the protrusion and the distance between the protrusions are preferably 3-20 μm and 5-20 μm. If the width of the protrusion is larger than the former value or the distance between the protrusions is less than the latter value, the aperture ratio is reduced, thereby reducing luminance and transmittance. On the contrary, if the width of the protrusion is less than the former value or the distance between the protrusions is larger than the latter value, the strength of the fringe field becomes week, thereby increasing response time and generating disordered textures.

Finally, the boundaries of the protrusions are preferably linear, slowly curved or bent with an obtuse angle in order to make the arrangement of the liquid crystal molecules to be uniform, thereby reducing the response time. In particular, when the protrusions on the lower and upper substrates face each other and form a substantially closed area, it is preferable that the boundaries of the facing portions of the protrusions are preferably linear, slowly curved or bent with an obtuse angle. It is preferable that the width of the protrusion becomes larger as goes from the ends to the center.

Figure 3:
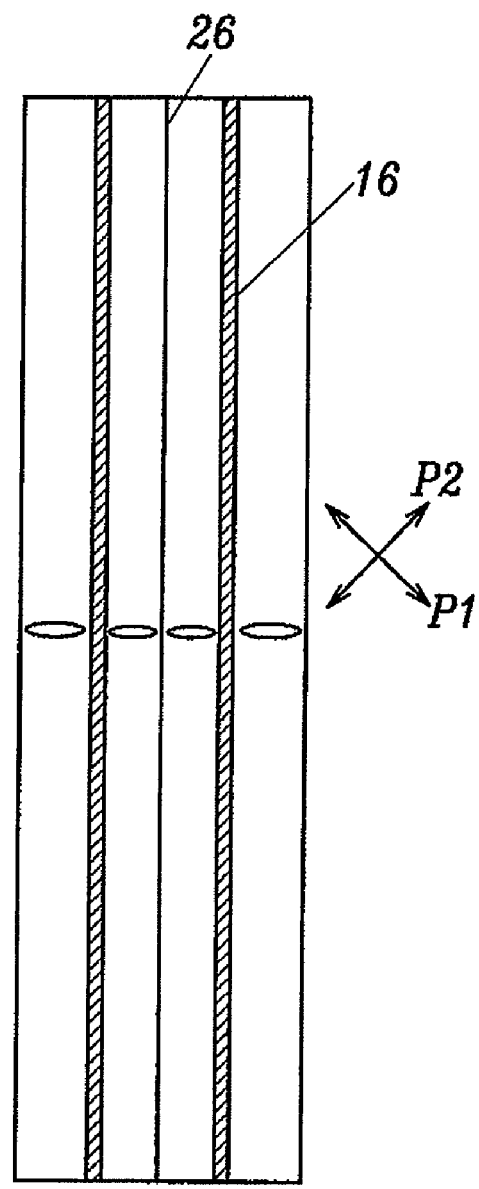
FIGS. 3 and 4 are layout views of protrusion patterns for forming multi-domains according to the first and the second embodiments of the present invention.

Now, the first embodiment of the present invention will be described with reference to FIG. 3. FIG. 3 shows a single pixel region. Only a protrusion pattern for a multi-domain LDC is illustrated in FIG. 3, and other elements such as TFTs, wires, etc., are not illustrated.

The first embodiment shown in FIG. 3 satisfies the fourth condition to obtain fast response time.

A linear protrusion 26 is formed longitudinally in the center of a pixel region of a TFT substrate, and two linear longitudinal protrusions 16 are formed alternately to the protrusion 26 on a color filter substrate. In the LCD having a protrusion pattern shown in FIG. 3, the liquid crystal molecules incline in parallel or in antiparallel directions when electric field is generated. That is, the long axes of the liquid crystal molecules are all arranged perpendicular to the direction of protrusions 16 and 26. Polarizing directions P1 and P2 are perpendicular to each other and make an angle of 45° with respect to the extending direction of the protrusions 16 and 26. This arrangement of the liquid crystal molecules is very stable, and then, the response time is very fast as about 30 ms. However, in this case, only 2 domains are formed, and the viewing angle is not good compared with the 4-domain cases.

Figure 4:
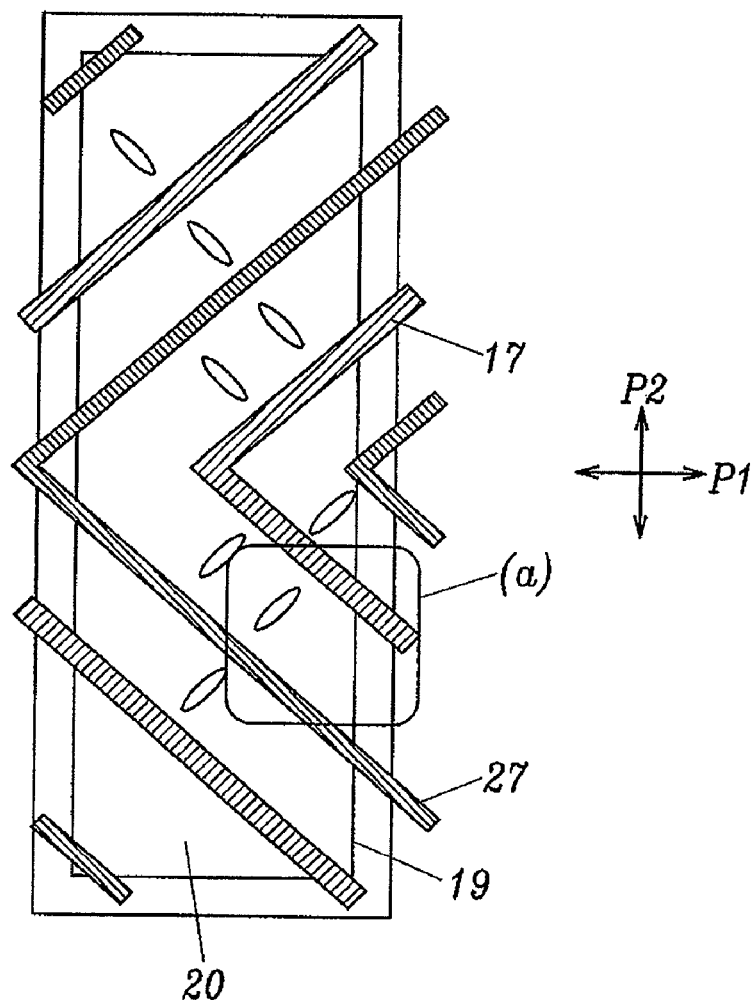

A protrusion pattern to solve the above-described problem is the second embodiment of the present invention shown in FIG. 4.

Protrusions 17 formed on a color filter substrate and protrusions 27 formed on a TFT substrate have all saw shapes and the protrusions 17 and 27 are arranged alternately. The bent portions of the saw-shaped protrusions are placed on the transverse line passing through the center of a pixel. The protrusion pattern shown in FIG. 4 is essentially similar to the protrusion pattern shown in FIG. 3 except having the bent portions, and, therefore, the response time is short. In addition, the LCD having the protrusion pattern shown in FIG. 4 has wide viewing angle because the protrusion pattern may form 4 domains in a pixel. Polarizing directions P1 and P2 are perpendicular to each other and make an angle of 45° to the saw-shaped protrusions 17 and 27, and then, the polarizing directions make an angle of 45° with respect to the directions of the long axes of the liquid crystal molecules.

Figure 5:
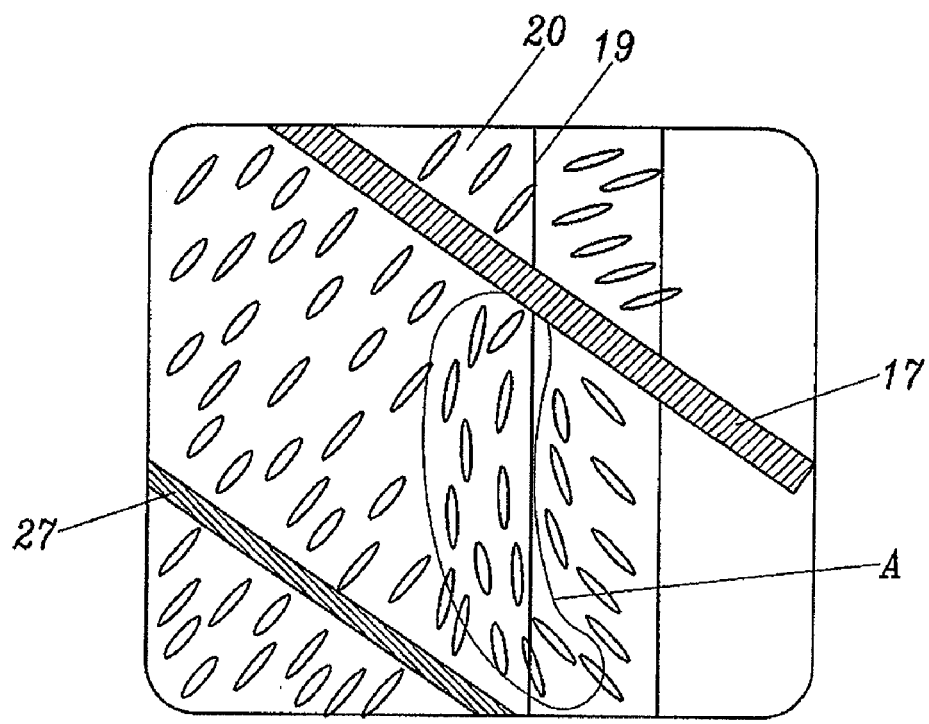
FIG. 5 is an enlarged view of portion (a) in FIG. 4.

In this case, however, the arrangement of liquid crystal molecules falls into disorder near the bent portions of the protrusions 17 and 27, and disclination is generated near the position where the protrusion 27 meets the boundary of the pixel electrode 20 because the angle therebetween is acute, as shown in FIG. 5 which is an enlarged layout view of portion (a) of FIG. 4. FIG. 5 shows that the arrangement of the liquid crystal molecules falls into disorder in the region A, which causes the decrease of the luminance. Moreover, the disorder of the arrangement may cause the afterimage because the disordered region may move whenever different pixel voltages are applied.

Figure 6A:
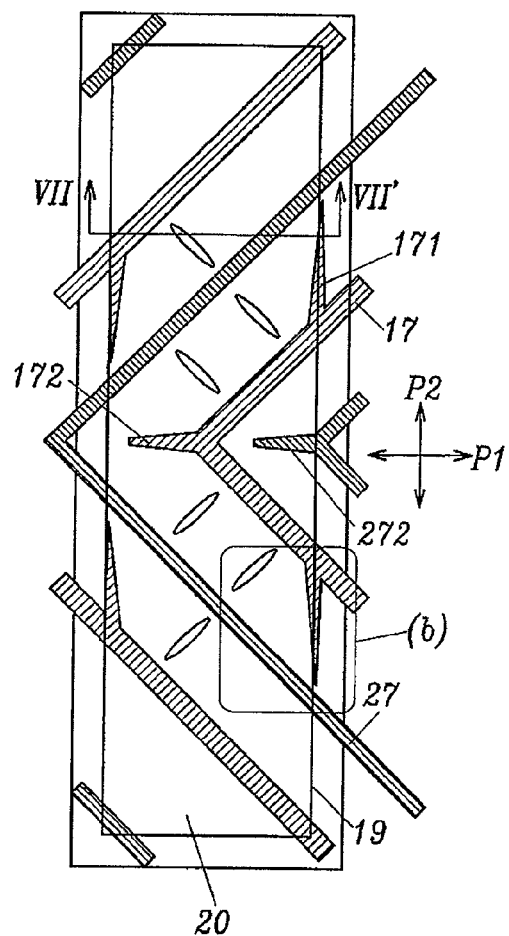
FIGS. 6A and 6B are layout views showing two protrusion pattern for forming multi-domains according to the third embodiment of the present invention.
Figure 6B:
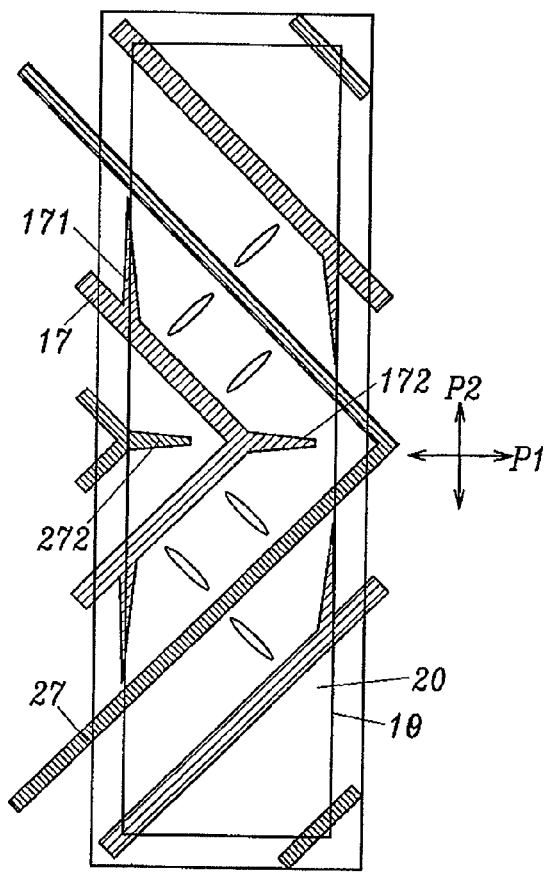

According to the third embodiment of the present invention shown in FIGS. 6A and 6B, the disclination generated in the second embodiment may be removed.

Figure 7:
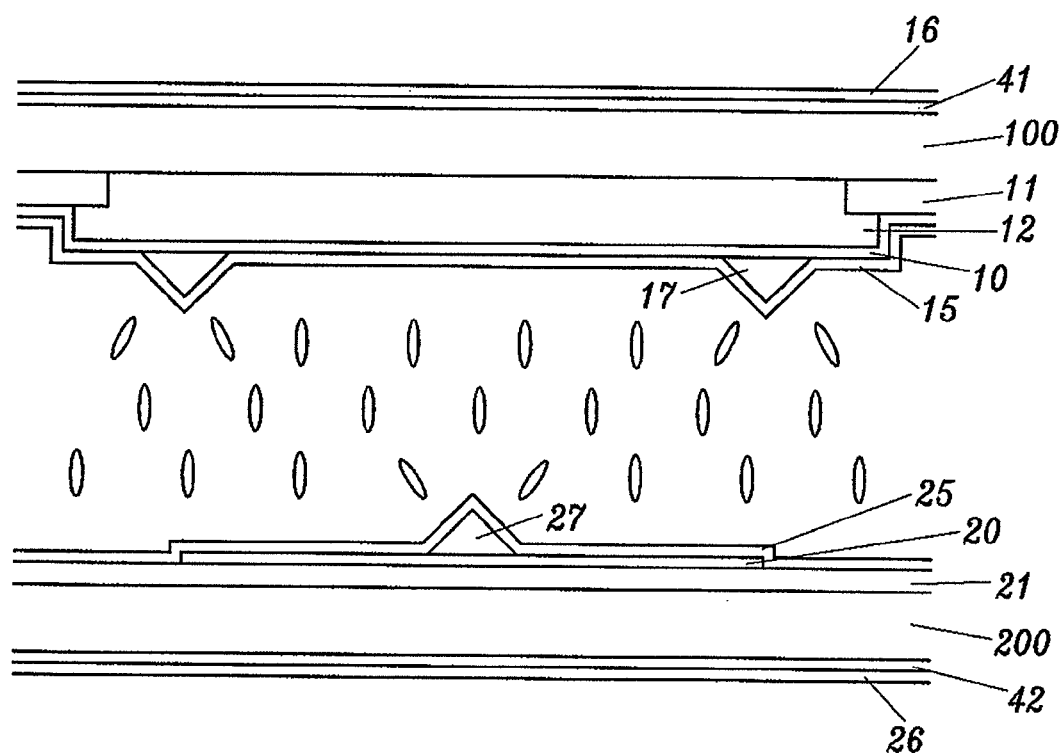
FIG. 7 is a sectional view of the substrate shown in FIG. 6A taken along the line VII-VII'.

FIGS. 6A and 6B are layout views showing two protrusion pattern for forming multi-domains according to the third embodiment of the present invention. FIG. 7 is a sectional view of the substrate shown in FIG. 6A taken along the line VII-VII'.

As shown in FIGS. 6A and 7, an LCD according to the third embodiment of the present invention includes a lower TFT substrate 200 and an upper color filter substrate 100. Though it is not shown in the figures, a plurality of gate lines and data lines are formed on the inner surface of the TFT substrate 200, and in a unit pixel region which is defined by the gate lines and the data lines, a pixel electrode 20 and a TFT as a switching element are formed. On the inner surface of the color filter substrate 100 opposite to the TFT substrate 200, a black matrix pattern 11 which defines a unit pixel region corresponding to the unit pixel region in the TFT substrate is formed, and a color filter 12 is formed therewithin. Protrusions 17 and 27 made of an organic material or the like are formed on the common electrode 10 and the pixel electrode 20. Vertical alignment films 15 and 25 are formed on the substrates 100 and 200 having protrusions 17 and 27.

To the outer surfaces of the substrates 100 and 200, polarizers 16 and 26 are attached respectively. Polarizing directions P1 and P2 of the polarizers 16 and 26 are respectively in transverse and longitudinal directions. Compensation films 41 and 42 are interposed between polarizer 16 and 26 and the substrates 100 and 200 respectively. An a-plate compensation film may be attached to one substrate and a c-place compensation film may be attached to the other substrate, or two c-place compensation films may be attached. A biaxial compensation film may be used instead of the uniaxial compensation film, and, in this case, the biaxial compensation film may be attached to only one substrate. The slow axis, which is the direction having a largest refractive index, of the a-plate or biaxial compensation film may be parallel or perpendicular to the polarizing directions.

The shape of the protrusion pattern is substantially similar to the pattern of the second embodiment. That is, protrusions 17 formed on a color filter substrate and protrusions 27 formed on a TFT substrate have all saw shapes and the protrusions 17 and 27 are arranged alternately. The bent portions of the saw-shaped protrusions are placed on the line transverse passing through the center of a pixel. Branches 172 and 272 extend from the convex point of one saw-shaped protrusion toward the apex to the other saw-shaped protrusion. A branch 171 of the protrusion 17 extend from the point where the protrusion 17 meets the boundary of the pixel electrode 20 toward the point where the boundary of the pixel electrode 20 and the saw-shaped protrusion 27 make an acute angle. Therefore, the edges of the protrusions formed on the two substrates are close, and the condition that the protrusion has only obtuse angles are satisfied thereby removing the disclination.

The liquid crystal molecules are tilted and twisted to the direction perpendicular to the protrusions 17 and 27 when the electric field is generated, and the average direction of the liquid crystal molecules in each region defined by the protrusions 17, 27, 171, 172 and 272 makes an angle of 45° with respect to the polarizing directions of the polarizer 16 and 26.

The width of the protrusions 17 and 27 is preferably in the range of 3-20 µm. If the width is too narrow, the region where the liquid crystal molecules incline by the protrusion is too small and, therefore, the effect of multi-domains is not sufficiently gained. On the contrary, if the width is too broad, the aperture ratio becomes low.

The width of the branches 171, 172 and 272 may gradually decrease from the point connected to the protrusions 17 and 27 to the end of the branches 171, 172 and 272.

The distance between protrusions 17 and 27 is preferably in the range of 5-20 µm, and the height of the protrusions 17 and 27 is preferably in the range of 0.3-3.0 µm.

Figure 8:
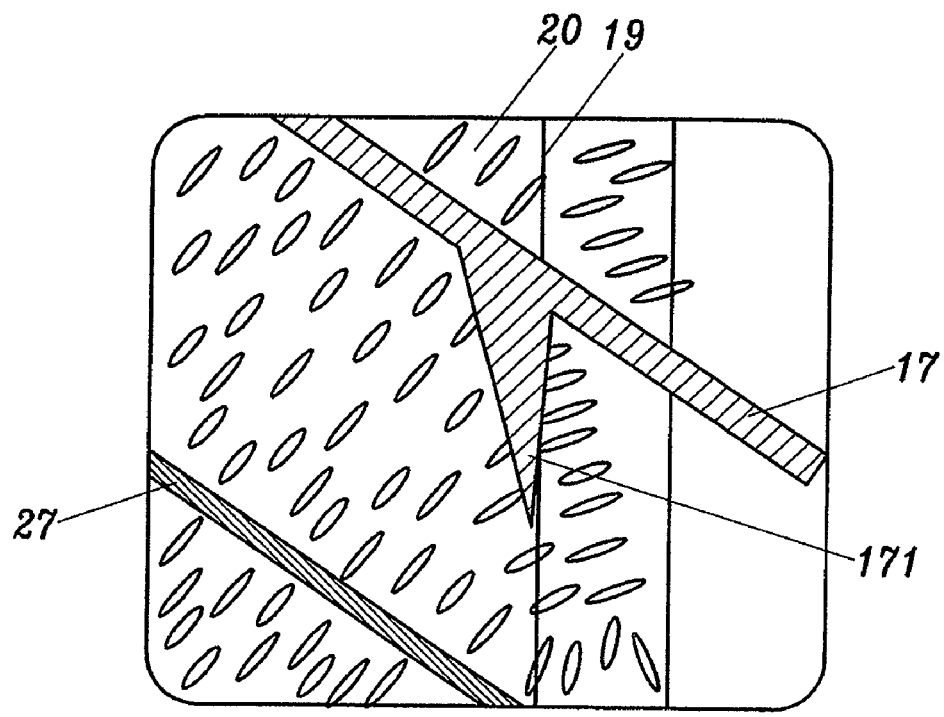
FIG. 8 is an enlarged view of portion (b) in FIG. 6A.

The liquid crystal molecules are arranged in order by the branch 171 as shown in FIG. 8 which is an enlarged layout view of portion (b) of FIG. 6A.

On the other hand, an LCD shown in FIG. 6B is substantially similar to the LCD shown in FIG. 6A except the direction of the saw-shaped protrusions 17 and 27. It depends on the pixel structure such as the position of the TFT.

If the average directions of the long axes of the liquid crystal molecules in adjacent regions defined by the protrusions make a right angle, luminance may increase. This structure is described in the fourth embodiment of the present invention.

Figure 9A:
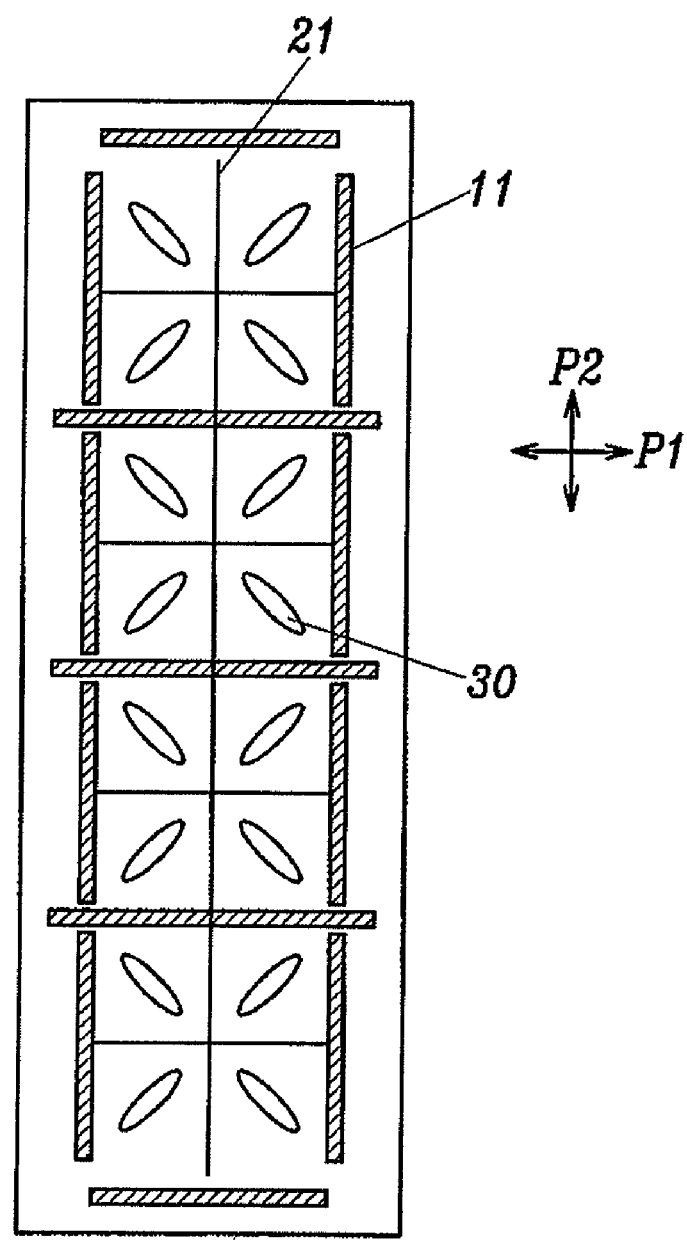
FIGS. 9A and 9B are layout views showing two protrusion patterns for forming multi-domains according to the fourth embodiment of the present invention.
Figure 9B:
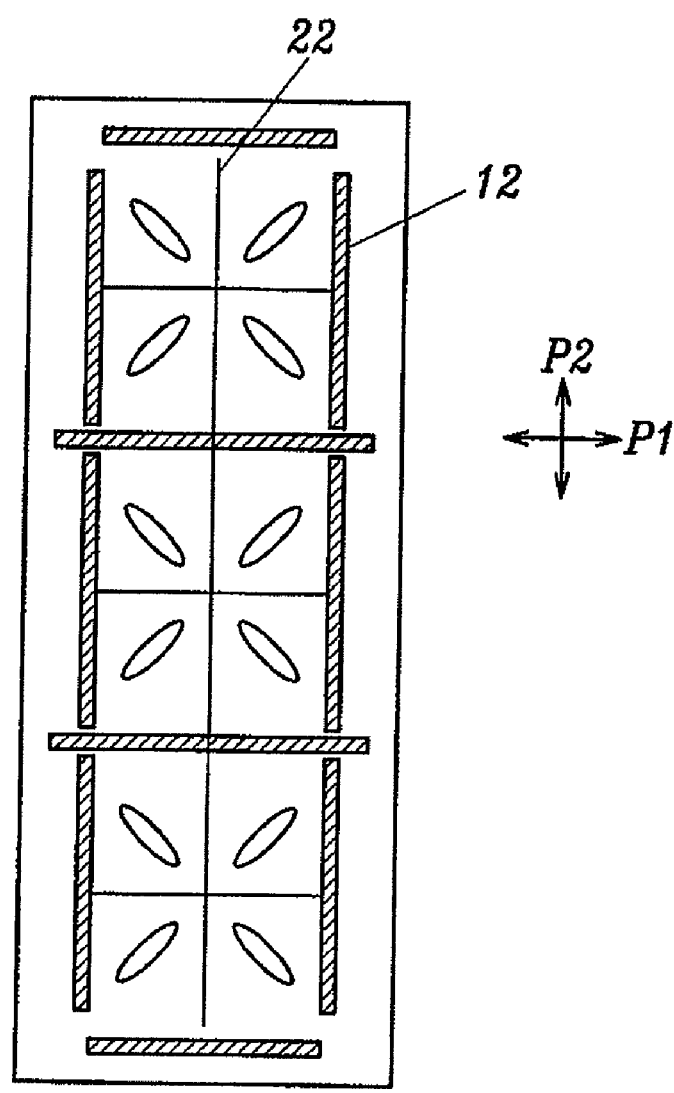

FIGS. 9A and 9B are layout views showing two protrusion patterns for forming multi-domains according to the fourth embodiment of the present invention. Only the protrusion pattern is shown in FIGS. 9A and 9B.

First, as shown in FIG. 9A, linear protrusions 11 and 21 in both transverse and longitudinal directions are formed alternately on the TFT substate and the color filter substrate. The protrusions 21 formed on the TFT substrate is noted as bold lines and those 11 on the color filter substrate is noted as hatched bars. When viewed from the top, the liquid crystal molecules in a regular tetragonal shaped region which is defined by the protrusions 11 and 21 are aligned from a bent point of the protrusion of one substrate to a bent point of the protrusion of the other substrate, as shown in FIG. 9A. In adjacent tetragonal regions, the liquid crystal directors make a right angle.

The protrusion pattern shown in FIG. 9A satisfies the first and the second conditions above-described. That is, four regions having different alignment are in a unit pixel region, the protrusions 11 and 21 formed on the upper and the lower substrates are arranged alternately, and the angle made by the protrusion in one substrate is either 90° or 180°, and the liquid crystal directors in adjacent regions make a right angle.

The polarizing directions P1 and P2 of the polarizers may be in transverse and longitudinal directions of the pixel respectively to have an angle of 45° relative to the directors when a sufficient voltage is applied.

In the LCDs having the protrusion pattern shown in FIG. 9A, the liquid crystal molecules are arranged to face each other in each two regions in diagonal directions immediately after the voltage is applied. However, the arrangement of the liquid crystal molecules are changed slowly by the tendency to be parallel to each other, and the liquid crystal molecules stop moving when the arrangement becomes stable. Accordingly, the LCD may show slow response time.

A protrusion pattern shown in FIG. 9B is similar to the protrusion pattern shown in FIG. 9A, but the region defined by protrusions has a rectangular shape instead of a right tetragonal shape. In this case, an angle made by the liquid crystal directors in adjacent regions is not exactly 90°, and an angle between the polarizing directions and the extending directions of the protrusions is not exactly 45°. However, in this case, one of the transverse or longitudinal directions is preferred by the liquid crystal molecules because the direction of long axes of the liquid crystal molecules makes a less angle with one of the two directions than with the other. Therefore, the arrangement of the liquid crystal molecules becomes quickly stable, and thus the response time is relatively short than the LCD shown in FIG. 9A.

The region defined by the protrusions may have a tetragonal shape having a long diagonal in a direction substantially perpendicular to the liquid crystal director in the regions to improve the response time by enlarging the width of the protrusions near the bent points. This structure is described in the fifth embodiment of the present invention.

Figure 10:
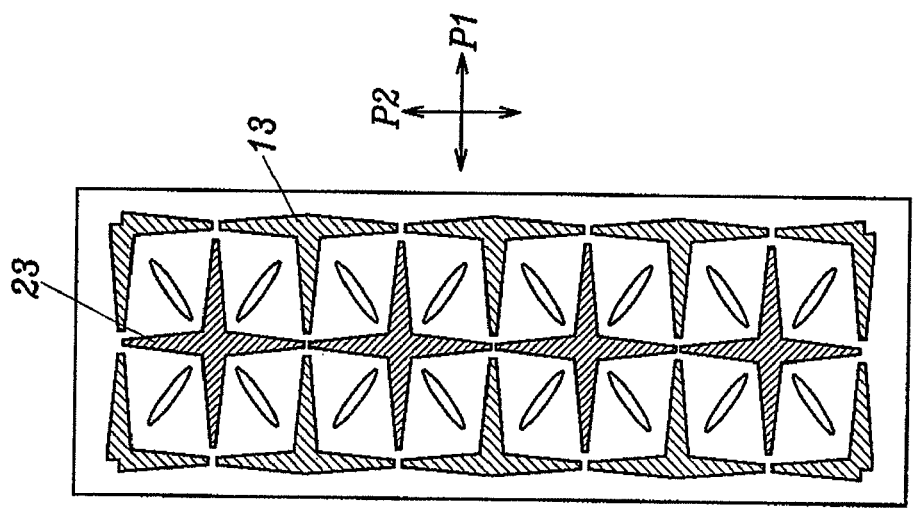

FIG. 10 is a layout view of a protrusion pattern for forming multi-domains according to the fifth embodiment of the present invention.

As shown in FIG. 10, shapes of the protrusions 13 and 23 are basically similar to those of the LCD shown in FIG. 9A according to the fourth embodiment. That is, the protrusions 13 on the color filter substrate form substantially tetragonal rings, and the protrusions 23 on the TFT substrate have cross shapes whose centers are located at the center of the defined by the protrusions 13 which form tetragonal rings. Then, the protrusions on the color filter substrate 100 and on the TFT substrate 200 are arranged alternately in both transverse and longitudinal directions.

The protrusions 13 and 23 on two substrates are arranged alternately to define substantially closed tetragonal regions. That is, the distance between the end portions of the protrusions 13 and 23 is less than the distance between remaining portions of the protrusions 13 and 23. It is possible that the edges of the protrusions 13 and 23 on the substrates are connected to each other such that the region defined by the protrusions 13 and 23 form a closed polygon when the substrates are shown from the top. Moreover, though the protrusions 13 on the color filter substrate which form substantially tetragonal ring are broken at the midpoint of each side of the tetragon, it is possible to form the protrusion 13 having a closed tetragonal shape.

The width of the protrusion 23 decreases as goes from the vertex of the tetragon to the midpoints of the sides of the tetragon, and that the protrusion 13 decreases as goes from the center of the cross to the edges of the branches of the cross. That is, the protrusion formed on one substrate has an obtuse angle at the bent portion of the protrusion, and the angle made by two protrusions on the different substrates are acute angle when the substrates are viewed from the top. Then, the diagonal substantially perpendicular to the liquid crystal director of the region defined by the protrusions 13 and 23 becomes longer than the diagonal substantially parallel to the liquid crystal director. The ratio of the diagonal perpendicular to the director with respect to the diagonal parallel to the director becomes larger if the width of the protrusions 13 and 23 is more enlarged at the bent point. Since the liquid crystal molecules become more uniformly aligned as the protrusions 13 and 23 are parallel to each other, the response time becomes reduced, as the ratio becomes large. The region defined by the protrusions 13 and 23 is symmetrical with respect to the diagonal perpendicular or parallel to the liquid crystal director.

The polarizing directions P1 and P2 of the polarizers may be in transverse and longitudinal directions of the pixel respectively to have an angle of 45° relative to the directors when a sufficient voltage is applied.

According to the fifth embodiment, four tetragonal rings formed of the protrusions exist in a unit pixel. However, the number of the rings may vary according to the conditions such as the size of the pixel. Still, to obtain the optimum luminance, the protrusions preferably form regular tetragonal rings.

The width and the height of the protrusion 13 and 23 are similar to those of the third embodiment. The distance between the bent points of the protrusions 13 and 23 is in the range of 10-50 cm and more preferably in the range of 23-30 μm. However, it depends on the size or the shape of the pixel.

Figure 11:
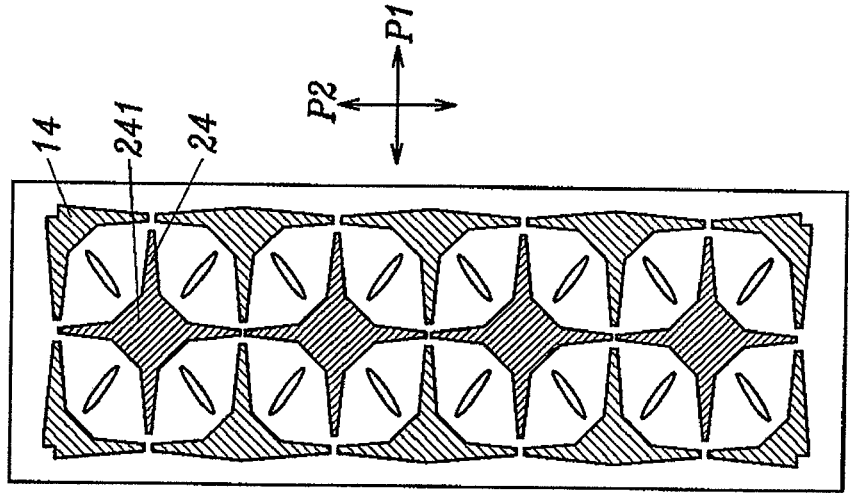

As in the sixth embodiment shown in FIG. 11, protrusions 14 are expanded from the vertex to the center of the tetragon and cross-shaped protrusions 24 are expanded from the center of the cross to the space between the branch of the cross such that the distance between the central portions of the protrusions 14 and 24 are close. That is, the protrusions 14 and 24 have other edges facing each other and parallel to each other, and the region enclosed by the protrusions 14 and 24 is substantially hexagonal. Therefore, the protrusions becomes relatively parallel to each other compared with those shown in FIG. 10, and thus the response time is reduced. However, the protrusion 24 has a tetragonal central portion 241 which has considerable area, and the protrusion 14 has a bent portion also having considerable area, thereby decreasing the protrusion ratio.

Figure 12:
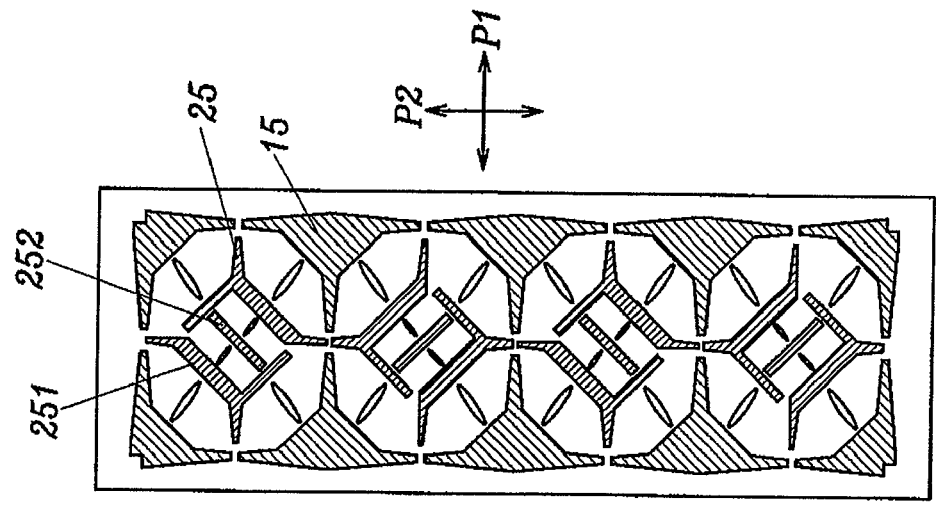
FIGS. 10 to 13 are layout views of protrusion patterns for forming multi-domains according to the fifth to the eighth embodiments of the present invention, respectively.

To increase the protrusion ratio, the protrusion pattern may be formed as in the seventh embodiment shown in FIG. 12. That is, the central portion 251 of the protrusion 25 is formed to have a tetragonal ring shape, and a linear protrusion 252 is formed in the central portion 251. Then, there are four longish regions formed at the rim and two small longish regions at the center. In this case, the pattern is somewhat complicated, but, high luminance, wide viewing angle and fast response time can be obtained.

In the meantime, the shape of the protrusions formed on the substrates may be exchanged. That is, according to the fourth to the seventh embodiments of the present invention, the tetragonal ring shaped protrusions are formed on the color filter substrate and the cross-shaped or modified cross-shaped protrusions are formed on the TFT substrate. However, they may be formed on opposite substrates.

Figure 13:
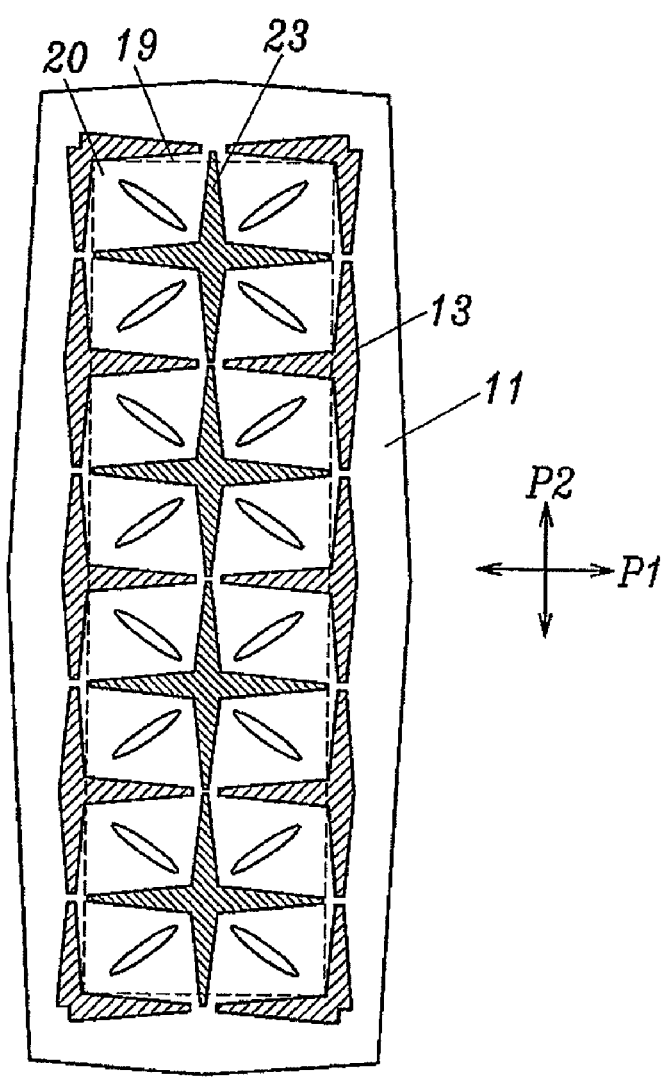

In the fourth to the seventh embodiments of the present invention, aperture ratio and luminance may be improved if some portions of the protrusions in the common electrode are placed outside the pixel region. FIG. 13 is a layout view of an LCD according to the eighth embodiment of the present invention.

As shown in FIG. 13, a tetragonal ring shaped protrusion 13 formed on a common electrode 10 is placed outside the pixel electrode 20 depicted by a dotted line in FIG. 13 to be shielded by a black matrix 11. The remaining structure is similar to that of the fifth embodiment of the present invention shown FIG. 10.

In the LCD shown in FIG. 4 according to the second embodiment, disclination may be prevented by a black matrix or a wiring instead of forming branch protrusions.

Figure 14:
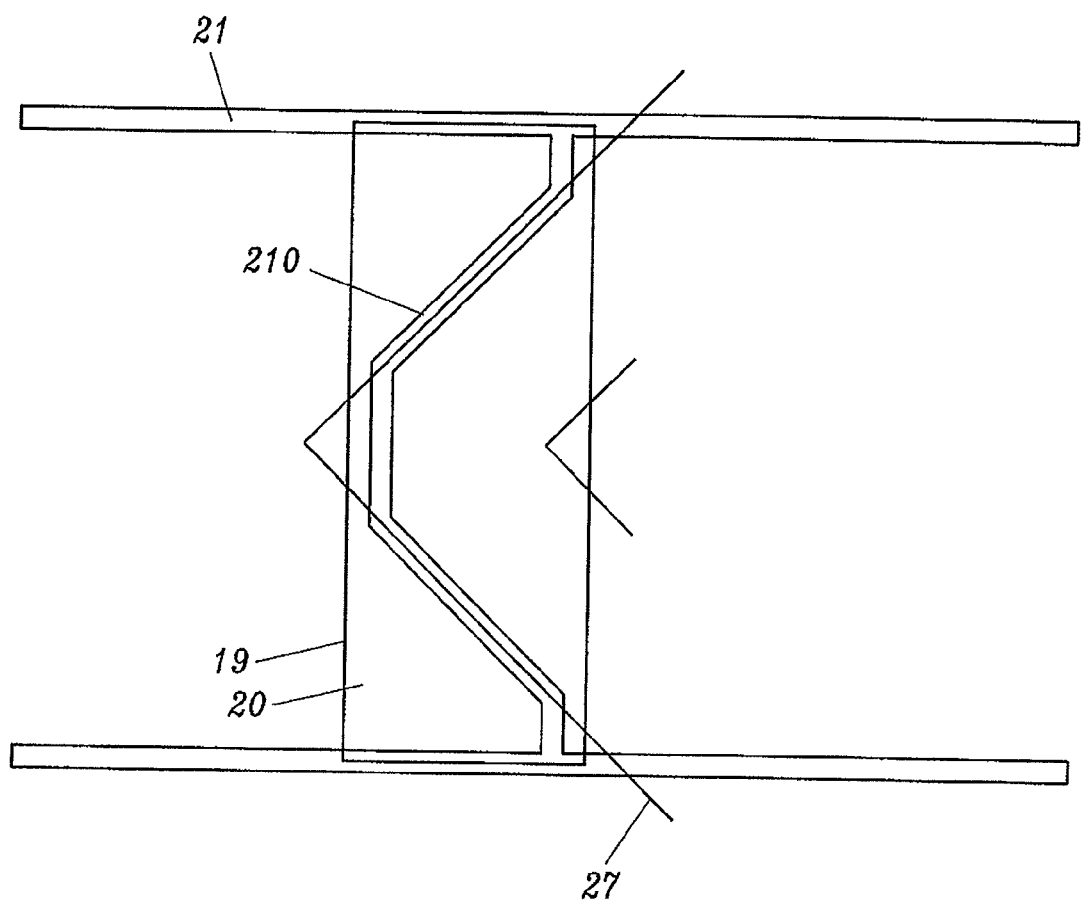
FIG. 14 is a layout view of a TFT substrate according to the ninth embodiment of the present invention.
Figure 15:
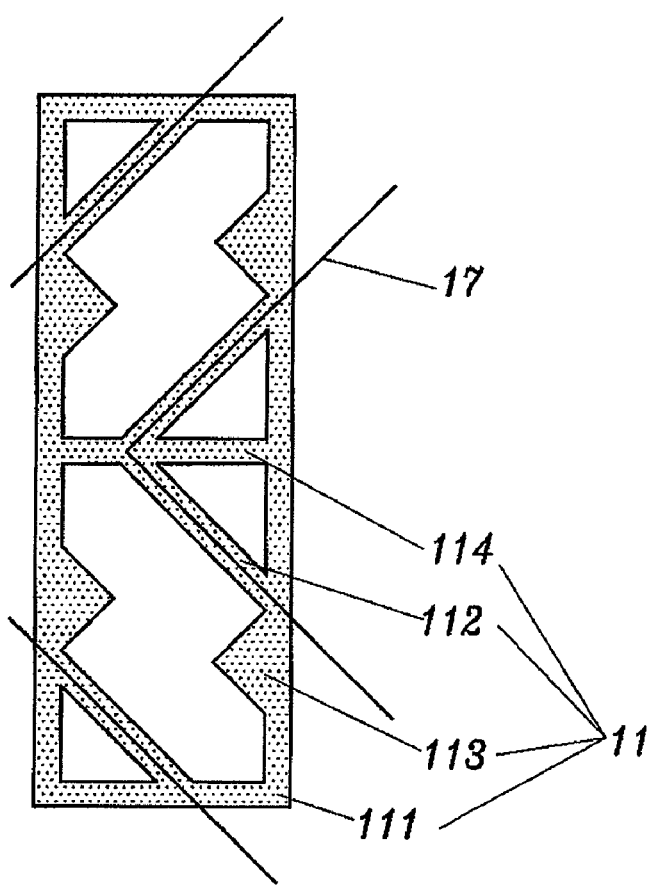
FIG. 15 is a layout view of a color filter substrate opposite the TFT substrate in FIG. 14 according to the ninth embodiment of the present invention.

FIGS. 14 and 15 are layout views of a color filter substrate and a TFT substrate according to the ninth embodiment respectively.

As shown in FIG. 14, a portion 210 of a gate line 21 which transmits a scanning signal is formed to have substantially the same shape as one of the protrusions which has the same shapes as those in FIG. 4. That is, the portion 210 of the gate line 21 has a trapezoid shape without the lower side. Then, the portion 210 made of opaque metal blocks the light from the backlight, and, therefore the light leakage or the decrease of luminance can be removed.

Next, as shown in FIG. 15, a black matrix 11 is formed on the color filter substrate to cover the regions where disclination is generated and the protrusion in the common electrode. The disclination regions are, as described above, the region where the protrusion 27 on the TFT substrate meets the boundary of the pixel electrode 20 and the region where the saw-shaped protrusions 17 and 27 are bent. The black matrix pattern which covers the disclination includes, as shown in FIG. 15, an edge portion 111 surrounding and defining a pixel region, a saw-shaped portion 112 to cover the protrusions 17, a triangular portion 113 to cover the disclination between saw-shaped protrusions 17 and 27 and a center portion 114 put across the pixel region to cover the disclination generated in the bent portion of the protrusions 17 and 27. Then, the light leakage generated by the disclination of the protrusions is prevented by the black matrix 11. Moreover, additional decrease of the protrusion ratio does not occur though the black matrix 11 is formed to have relatively large area because the region that the black matrix covers may not be used for display.

Figure 16:
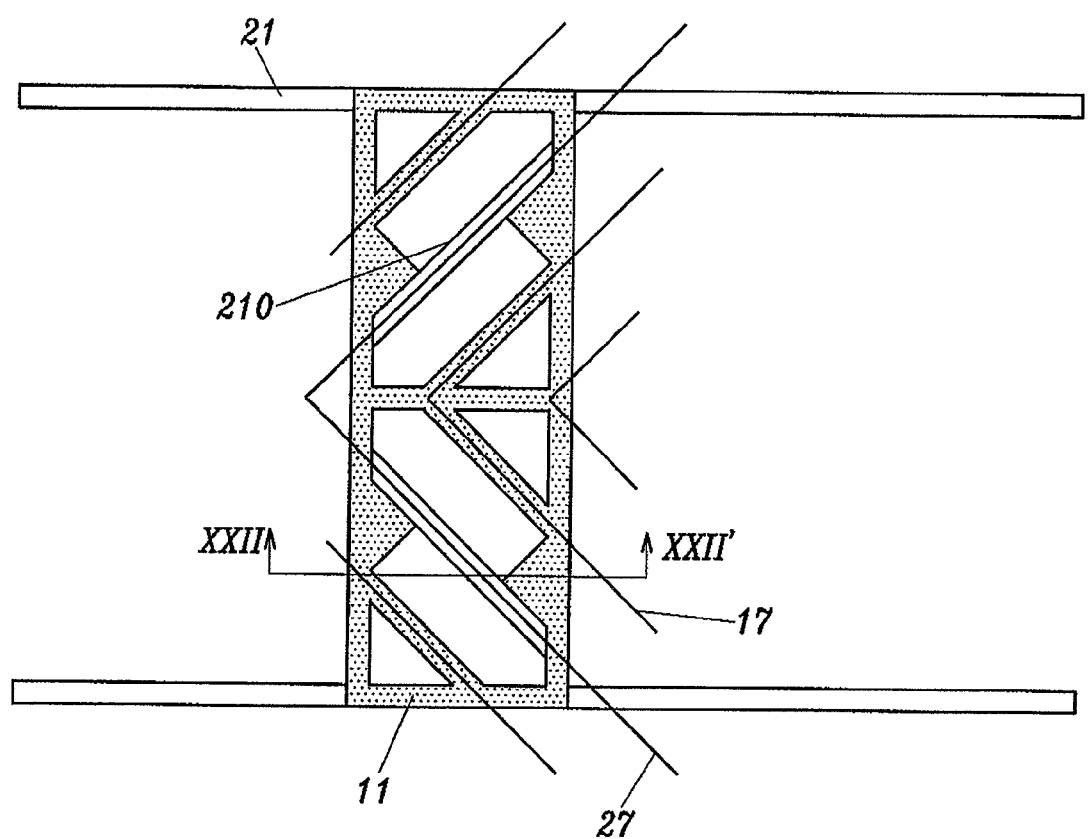
FIG. 16 is a layout view of an LCD having the TFT substrate and the color filter substrate shown in FIGS. 14 and 15 according to the ninth embodiment of the present invention.
Figure 17:
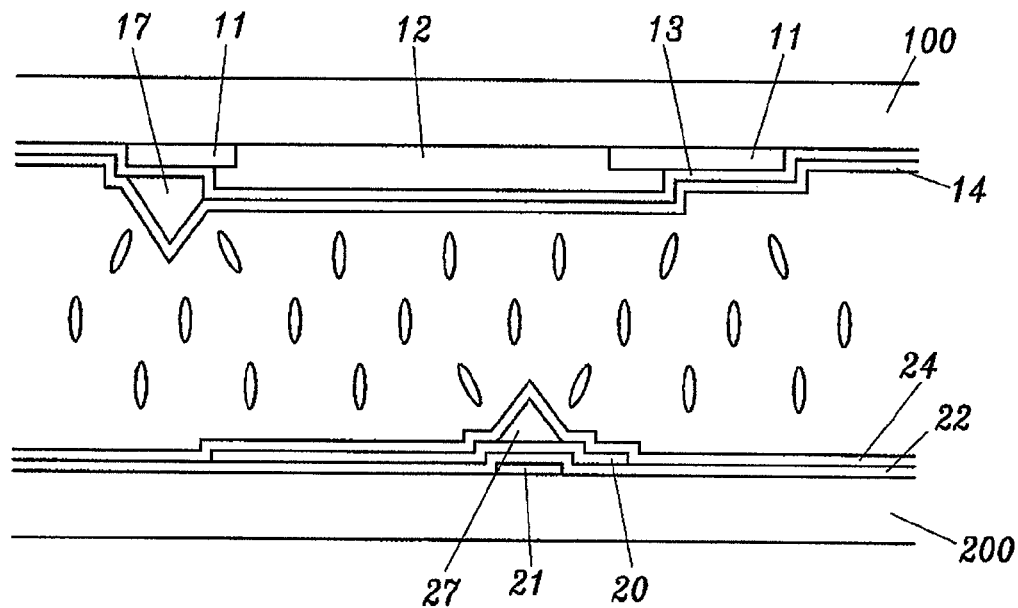
FIG. 17 is a sectional view of the LCD shown in FIG. 16 taken along the line XVII-XVII'.

FIG. 16 is a layout view of an LCD having the TFT substrate and the color filter substrate shown in FIGS. 14 and 15 according to the ninth embodiment of the present invention. FIG. 17 is a sectional view of the LCD shown in FIG. 16 taken along the line XVII-XVII'.

As shown in FIGS. 16 and 17, a portion 210 of a gate line 21 is formed on a lower TFT substrate 200. The portion 210 has a trapezoid shape without the lower side. An insulating layer 22 covers the gate line 21, and a pixel electrode 23 is formed thereon. A saw-shaped protrusion 27 over the portion 210 of the gate line 21 is formed using an organic material or the like. A vertical alignment layer 24 is formed thereon.

On the other hand, a black matrix 11 is formed on a upper color filter substrate 100 to shield the outside of the pixel regions, the protrusion and the disclination regions. In the pixel region within the black matrix 11, a color filter 12 is formed. An ITO common electrode 13 is formed thereon. A protrusion 17 is formed on the common electrode. The protrusion 17 is arranged alternately to the protrusion 27 formed on the lower substrate, and the protrusions 17 and 27 are parallel to each other. A vertical alignment layer 14 is formed to cover the protrusion 17 and the common electrode 10.

A liquid crystal material layer with negative dielectric anisotropy is interposed between two substrate 100 and 200, and the liquid crystal molecules in most regions are homeotropically aligned to the substrates 100 and 200 by the aligning force of the alignment layers 14 and 24. The liquid crystal molecules near the protrusions 17 and 27 are tilted by the protrusions.

Figure 18:
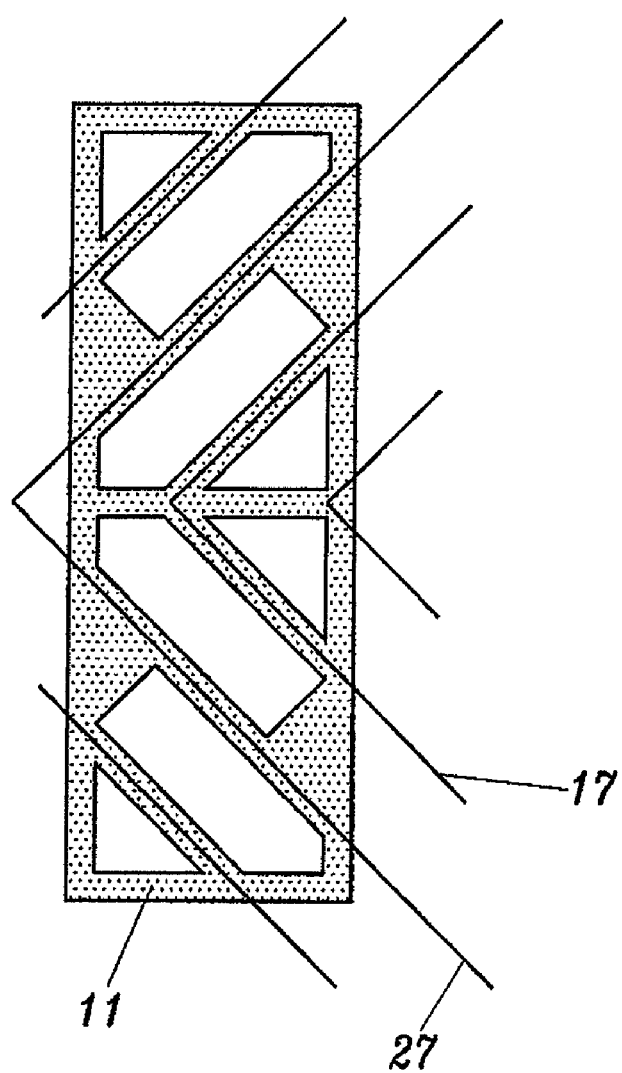
FIG. 18 is a layout view of a color filter substrate according to the tenth embodiment of the present invention.

It is possible to form a gate line as in a conventional LCD and the protrusions formed on the lower substrate is also covered by the black matrix, as shown in FIG. 18 which is a layout view of a color filter substrate according to the tenth embodiment of the present invention.

A black matrix 11 is formed to define a pixel region and to cover the protrusion 17 to form multi-domain, the disclination between saw-shaped protrusions 17 and 27 and the disclination generated in the bent portion of the protrusions 17 and 27 as in the ninth embodiment. In addition, the black matrix 11 includes another portion to cover the protrusion 27 formed on the lower substrate.

If the black matrix covers the protrusions and the disclination as in the tenth embodiment, it is not necessary to consider the influence due to the change of the gate line pattern and no additional process step is required.

Moreover, the shape of the pixel electrode may be changed instead of forming the branch protrusion in the second embodiment.

As shown in the above, the region where the disclination is generated is the region where the protrusion of the TFT substrate meets the boundary of the pixel electrode. This region is the place where the first condition that the bent angle of the protrusion pattern should be an obtuse angle is not satisfied because the boundary of the pixel electrode is essentially similar to the protrusion. That is, the arrangement of the liquid crystal molecules falls into disorder, and the disordered arrangement causes the decrease of the luminance and the afterimage.

Figure 19:
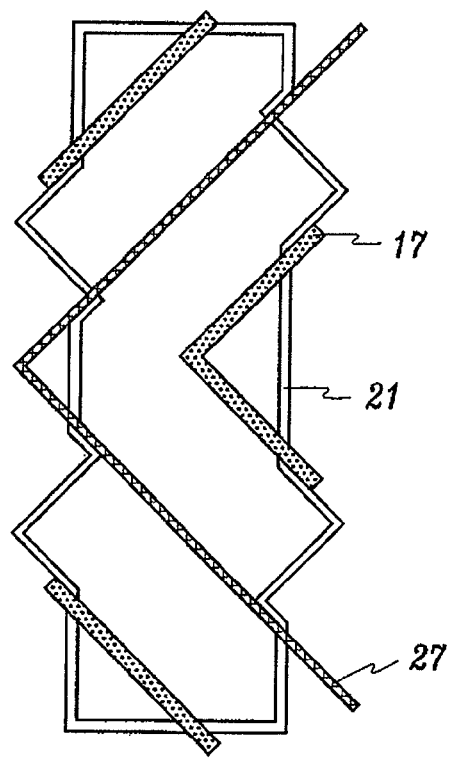
FIGS. 19 and 20 are layout views of the LCDs according to the eleventh and the twelfth embodiments of the present invention respectively.

Therefore, in the eleventh embodiment of the present invention, the shape of the pixel electrode 21 is changed to make an angle between the protrusion 27 formed in the pixel electrode 21 and the boundary of the pixel electrode 21 to be an obtuse angle. Then, as shown in FIG. 19, the pixel electrode 21 has a saw shape which is convex between the protrusions 17 and 27 formed in the common electrode and the pixel electrode respectively.

Figure 20:
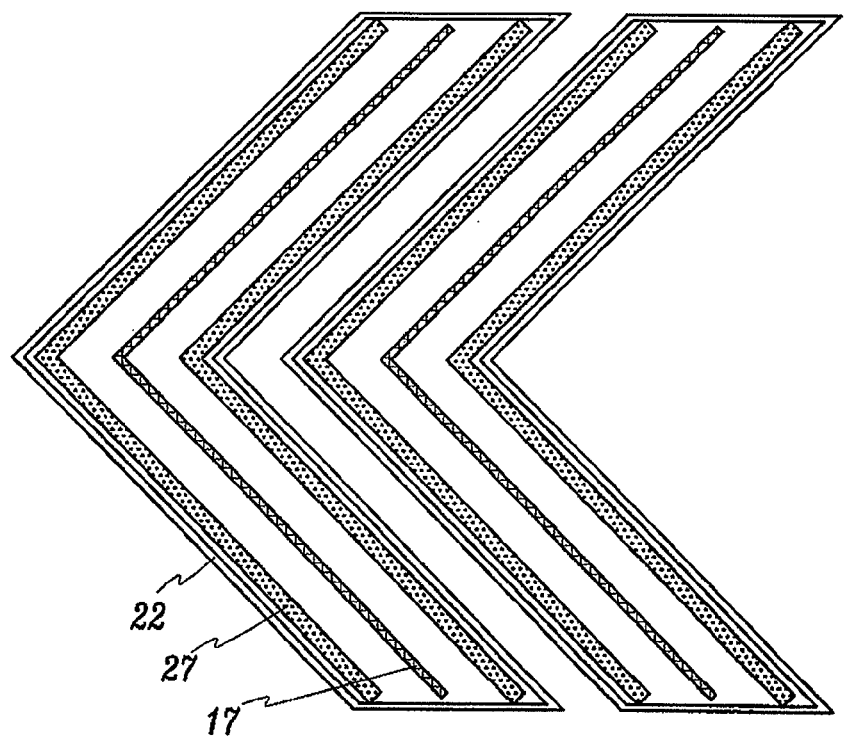

In the twelfth embodiment of the present invention, the pixel electrode is formed to have a saw shape surrounding the protrusions as shown in FIG. 20 which is a layout view of an LCD according to the twelfth embodiment of the present invention.

Since the pixel electrode 22 is formed to have a saw shape surrounding the protrusions 17 and 27, the regions where the protrusions 17 and 27 meet the boundary of the pixel electrode are removed thereby removing the disclination.

In the eleventh and the twelfth embodiments of the present invention, the width and the height of the protrusions and the distance therebetween are similar to those in the third embodiment.

According to the embodiments of the present invention, multi-domain LCDs are formed using various protrusion patterns to control the arrangement of liquid crystal molecules, therefore wide viewing angle is obtained, disclination is removed and the luminance is increased.

In the drawings and specification, there have been disclosed typical preferred embodiments of the invention and, although specific terms are employed, they are used in a generic and descriptive sense only and not for purposes of limitation, the scope of the invention being set forth in the following claims:

What is claimed:

1. A liquid crystal display comprising:
   a first substrate;
   a first electrode formed on the first substrate;
   a first protrusion formed on the first electrode, and in direct contact with the first electrode;
   a second substrate;
   a black matrix defining a pixel region; and
   a liquid crystal layer interposed between the first and second substrates, wherein the first electrode is bent in a plan view based on an angle of the first protrusion, wherein the first electrode is bent to make an obtuse angle between the first protrusion and boundary of the first electrode, and wherein the first electrode covers most of the pixel region, wherein the first protrusion is distinct from a storage electrode and from a gate line and a data line.

2. The liquid crystal display of claim 1, further comprising:
   a second electrode formed on the second substrate; and
   a second protrusion formed on the second electrode.

3. The liquid crystal display of claim 1, wherein the first electrode is bent to have the same contour as the first protrusion.

4. The liquid crystal display of claim 2, wherein the first electrode has a saw shape between the first protrusion and the second protrusion.

5. The liquid crystal display of claim 2, wherein the first electrode has a convex shape between the first protrusion and the second protrusion.

6. The liquid crystal display of claim 1, wherein the liquid crystal display is a vertically aligned mode liquid crystal display.

* * * * *